May 31, 1960 C. M. LADD ET AL 2,938,848
FUEL ELEMENTS FOR NUCLEAR REACTORS
Filed April 30, 1958 4 Sheets-Sheet 1
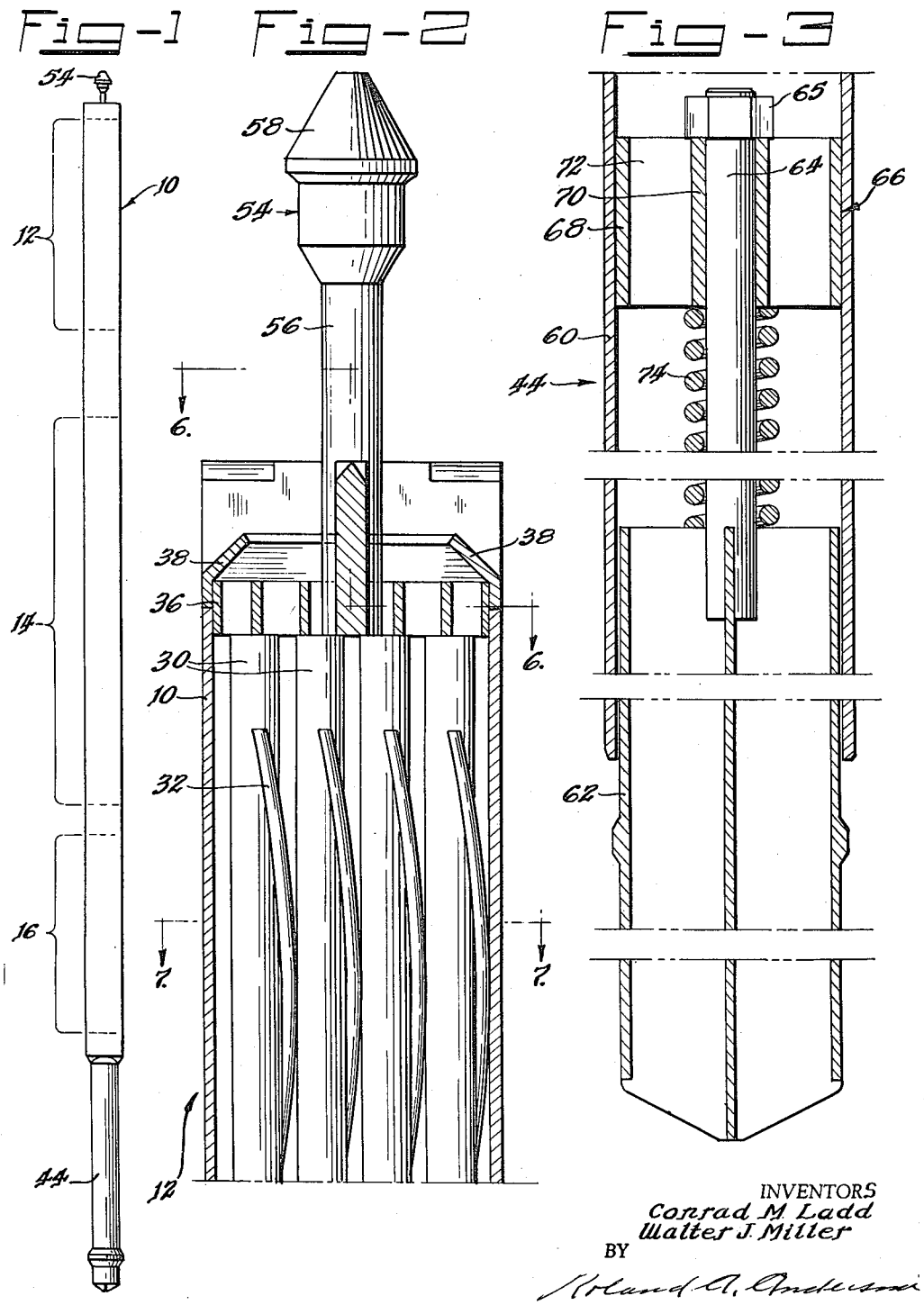
INVENTORS
Conrad M Ladd
Walter J Miller
BY
Roland A. Anderson
Attorney

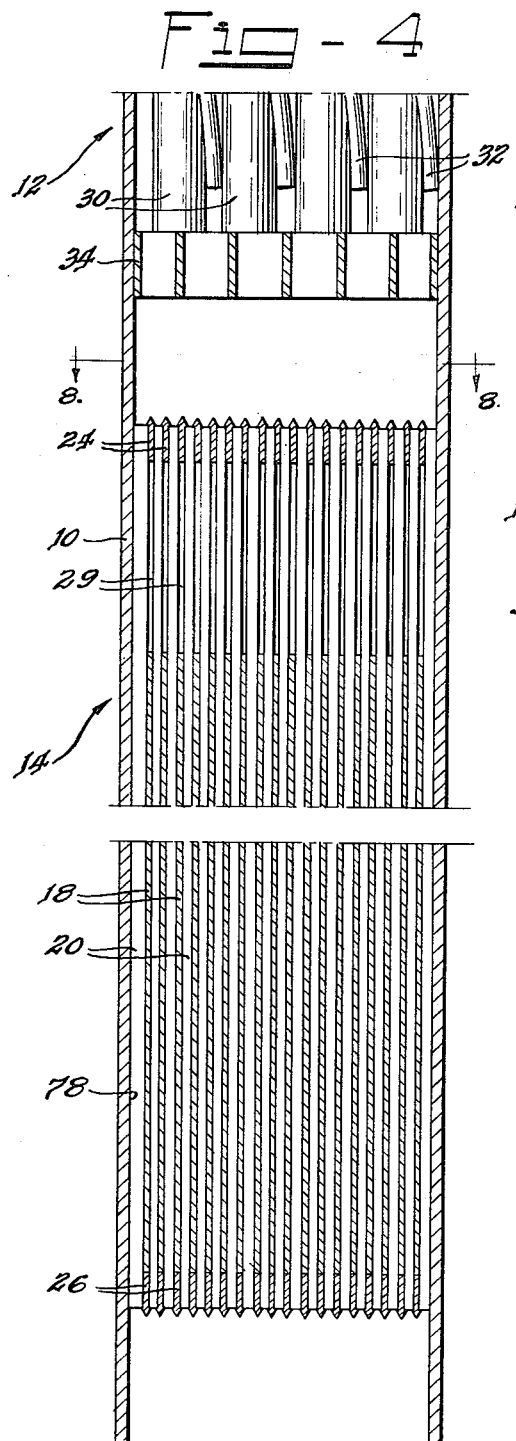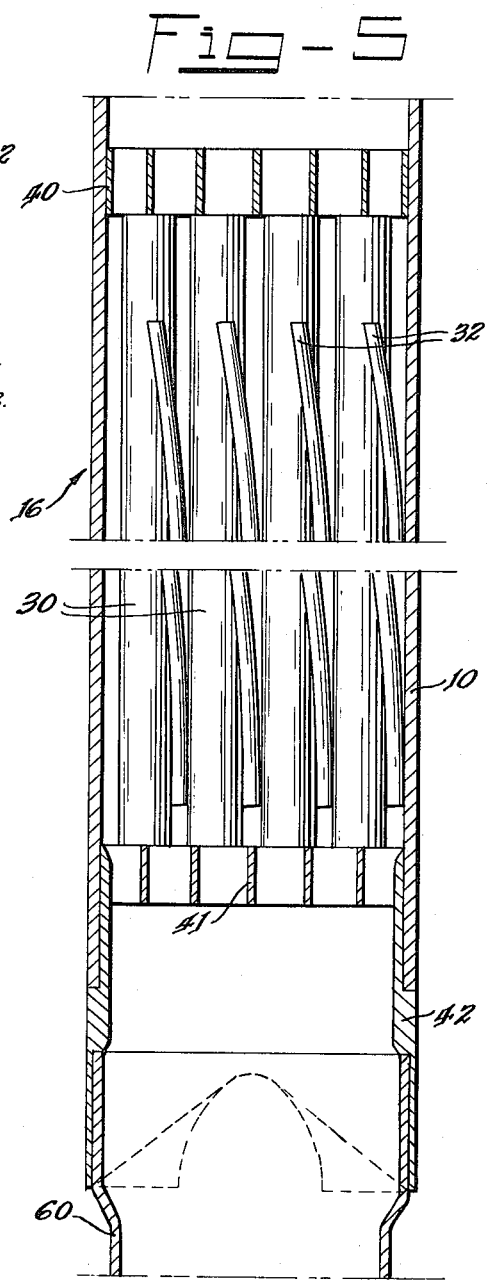

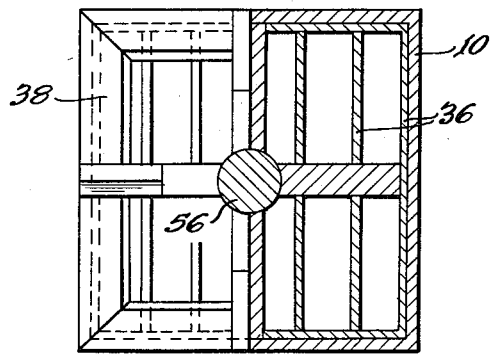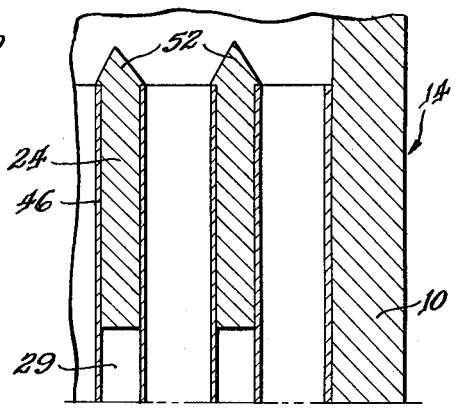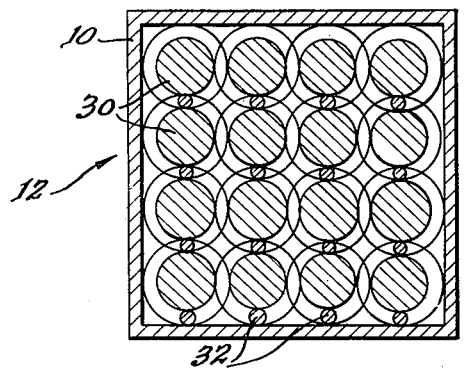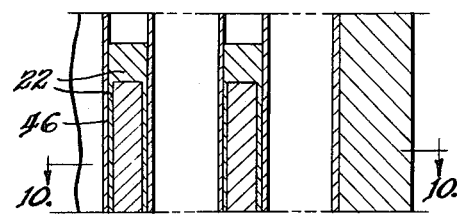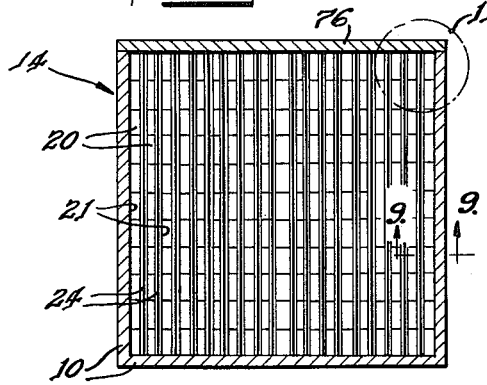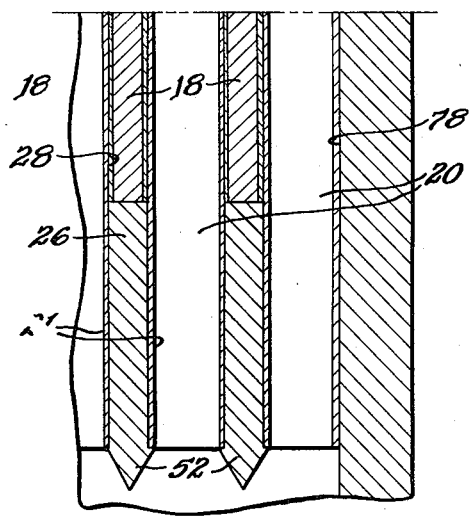

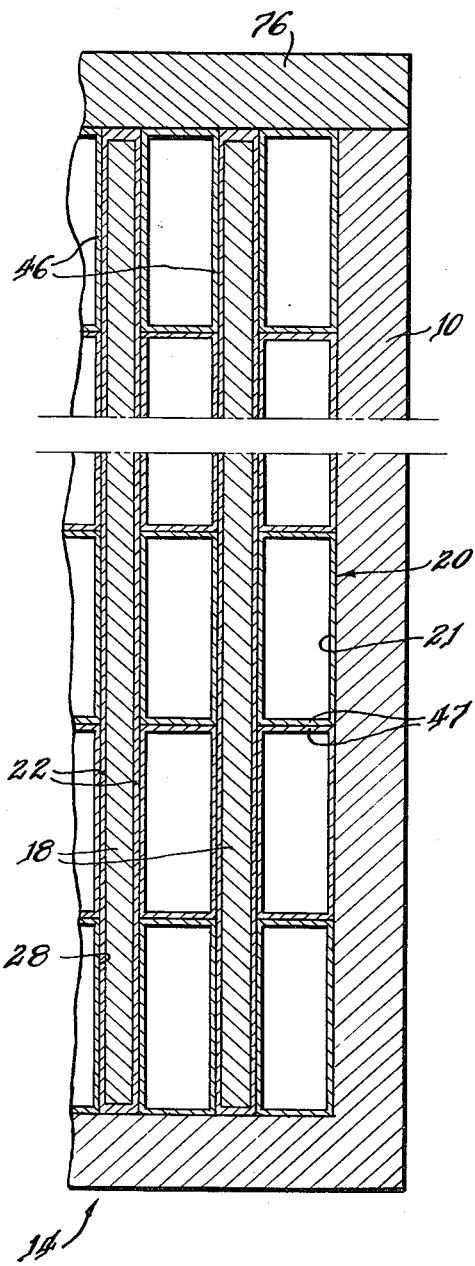
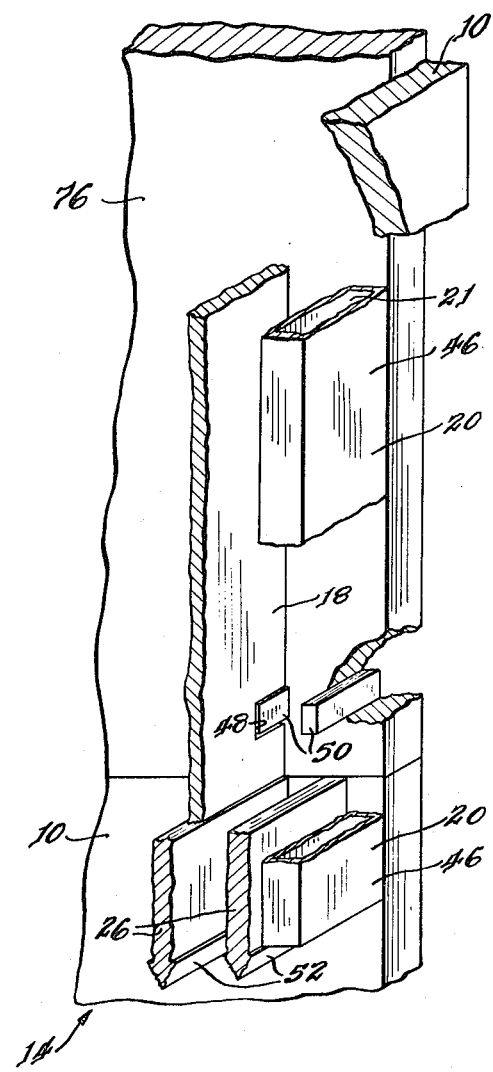

United States Patent Office 2,938,848
Patented May 31, 1960

2,938,848

FUEL ELEMENTS FOR NUCLEAR REACTORS

Conrad M. Ladd, Detroit, Mich., and Walter J. Miller, Trafford, Pa., assignors to the United States of America as represented by the United States Atomic Energy Commission Filed Apr. 30, 1958, Ser. No. 732,107

2 Claims. (Cl. 204—193.2)

This invention relates to fuel elements for nuclear reactors. More particularly, it relates to a fuel element consisting of a plurality of thin flat plates of fuel material enveloped by a liquid heat transfer medium within chambers provided with voids and separated by coolant passages whereby thermal and mechanical stresses are essentially eliminated.

In the development of the nuclear art, many different types of fuel and fuel elements have been conceived and developed for use in nuclear reactors. Some nuclear reactors employ, for example, a solution or slurry of fuel material, such as uranium or plutonium, which is circulated between the active portion of the reactor and a region where energy may be extracted from the solution or slurry. Other reactors contain fuel materials which are in a solid state and which are fixed in position during operation. These solid state fuel materials are designed and fabricated to have various geometric forms such as spherical, cubical, cylindrical, and a host of other more esoteric configurations. It is to the latter solid state type of fuel materials that the present invention appertains.

One type of reactor in which the fuel element of the present invention may be used is described in Zinn Patent 2,841,545, dated July 1, 1958; it will become apparent, however, that the fuel element disclosed herein, with slight modifications, may be used in many other types of reactors.

Since heat is released in the operation of nuclear reactors, specifically by and within the fuel material primarily, provision must be made for the passage of coolant through solid state fuels which are fixed in position within their respective reactors during operation to prevent destructively high temperatures from prevailing. Therefore, the fuel material within nuclear reactors is generally distributed in some lattice arrangement, rather than as a homogeneous continuous mass, for cooling purposes and for other reasons based on nuclear physics considerations. However, the passage of coolant over fuel materials in direct contact therewith has been found to erode, and in some cases to corrode, the fuel materials. To prevent such erosion and corrosion, fuel materials are sealed within protective claddings or jackets made of materials, such as aluminum or stainless steel, which are relatively impervious to erosion and corrosion when coolant is caused to flow thereover. To insure high heat transfer rates from the fuel material to the cladding or jacket and thence to the coolant with which the latter is in intimate contact, a heat transfer medium or bonding material having high thermal conductivity, such as silicon or sodium, is often sealed within the cladding surrounding the fuel material, such bonding material excluding voids and providing a continuous path of low thermal impedance between the cladding and the fuel material.

Certain disadvantages, however, have heretofore been inherent in fuel elements in which the fuel material is sealed and bonded within a protective cladding. For example, the fuel material, in undergoing thermal expansion due to the high temperatures within nuclear reactors, often causes geometric distortion or rupturing of the fuel element; such expansion also creates mechanical stresses on components of the reactor adjacent to the fuel element. Additionally, fuel materials upon irradiation, "grow" or expand within their cladding due to nuclear changes; irradiation also causes the formation of fission products, some of which are gaseous, within the sealed protective cladding. Temperature expansion, nuclear "growth," and the formation of gaseous fission products, understandably, threaten to, and often do, destroy the integrity of the sealed protective cladding, thus terminating the sheltered state of the fuel material therein. It is thus appreciated that a fuel element that could successfully avert or cope with these detrimental occurrences would be highly desirable.

From an economic standpoint, also, fuel elements of the type to which the present invention relates have heretofore left much to be desired. The fabrication of fuel elements, for example, often requires custom-made components, very small dimensional tolerances, and elaborate assembly techniques. Likewise, the chemical processing of used fuel elements, to recover the unspent portions of fuel material therein, has required the dissolution of many or all components of the fuel elements, including the protective cladding and the bonding material. To isolate the unspent fuel material from the other component materials in such processing often requires a large number of chemical separations involving a series of successive dissolutions, precipitations, and other techniques. It is readily appreciated that a fuel element in which only the partially-spent fuel material would have to be subjected to chemical processing to recover the unspent portion thereof, would substantially reduce the per unit cost of energy made available through nuclear chain-reacting systems.

It is an object of the present invention, therefore, to provide a fuel element for a nuclear reactor in which thermal and mechanical stresses are essentially eliminated.

A further object of the present invention is to provide a fuel element for a nuclear reactor which is relatively easy and economical to fabricate.

It is also an object of the present invention to provide a fuel element for a nuclear reactor from which partially-spent fuel material can be removed and processed and the structural portion of the fuel element reused.

Another object of the present invention is to provide a fuel element for a nuclear reactor which has a high fuel surface-to-volume ratio, thereby permitting the rapid removal of large quantities of heat and, consequently, the maintenance of high power densities within the reactor.

Still another object of the present invention is to provide a fuel element for a nuclear reactor in which the geometric distribution, and volume and mass percentages of fuel material can be readily varied over a wide range.

These and other objects of the present invention may be best understood from a consideration of the following detailed description and the accompanying drawings, in which:

Fig. 1 is an elevational view of the fuel element of the present invention;

Fig. 2 is a vertical sectional view of the upper end of the fuel element showing a portion of the upper blanket section;

Fig. 3 is a vertical sectional view of a positioning device disposed at the lower end of the fuel element;

Fig. 4 is a vertical sectional view of the fuel section of the fuel element;

Fig. 5 is a vertical sectional view of the lower blanket section of the fuel element showing the junction therewith of the positioning device shown in Fig. 3.

Fig. 6 is a horizontal sectional view taken along line 6—6 of Fig. 2;

Fig. 7 is a horizontal sectional view taken along line 7—7 of Fig. 2;

Fig. 8 is a horizontal sectional view taken along line 8—8 of Fig. 4;

Fig. 9 is an enlarged vertical sectional view of a portion of the fuel section taken along line 9—9 of Fig. 8;

Fig. 10 is a horizontal sectional view taken along line 10—10 of Fig. 9; and

Fig. 11 is a vertical sectional view showing the encircled portion 11 of Fig. 9 in perspective.

As may be seen in Fig. 1, the fuel element of the present invention consists generally of a square tubular cladding or jacket 10 containing three distinct sections disposed in tandem within the jacket: an upper blanket section 12, a central fuel section 14, and a lower blanket section 16.

Central fuel section 14 has a square cross section and, as shown in Figs. 4, 9, and 10, consists of a plurality of thin flat rectangular plates 18 of fuel material and a plurality of rows 20 of tubes 46 of oblong shape having passages 21, the plates and tube rows occurring alternately, there being one more coolant tube row than fuel plate. The coolant tubes 46 of each row 20 abut one another at their narrow sides. Enveloping each fuel plate 18 and contacting tubes 46 adjacent thereto is a layer of heat transfer medium or bonding material 22 which is fluid at the temperatures at which the reactor is to be operated. Between tube rows 20 at the upper and lower portions thereof, respectively, upper spacers 24 and lower spacers 26, best seen in Figs. 4 and 9, are disposed normally to the axes of passages 21, the spacers being joined at their sides to the tube rows and at their ends to the interior of jacket 10. Spacers 24 and 26, in conjunction with tube rows 20 and the sides of jacket 10 to which the panels are joined, form a plurality of chambers 28 in which fuel plates 18 and bonding material 22 are disposed. The tube rows 20 may be left unjoined to the sides of jacket 10 to allow communication between chambers 28. As shown in Fig. 9, fuel plates 18 do not extend the full distance between upper and lower spacers 24 and 26, respectively, there being voids 29 provided within chambers 28 at the upper portions thereof between the top of fuel plates 18 and upper spacers 24. There is sufficient bonding material 22 to cover the tops of fuel plates 18 at all times.

Upper blanket section 12, as shown in Figs. 2 and 7, generally consists of a plurality of solid cylindrical pins 30 arranged in a square lattice and separated from one another by a plurality of helical ribs 32, one such rib being spiralled around each pin 30 from top to bottom and being joined thereto. Pins 30 and ribs 32 are joined wherever there is any physical contact between the pins and ribs, thereby effecting a continuous unitary structure. Upper blanket section 12 is supported within jacket 10 by a reticulated square retainer or grating 34, shown in Fig. 4, which is joined to the interior of the jacket just below the upper blanket section and above the central fuel section 14. A similar grating 36, shown in Fig. 2, is disposed above upper blanket section 12 and rests thereon, grating 36 being held firmly against the upper blanket section by inwardly pitched tabs 38 on the upper end of jacket 10.

Lower blanket section 16, shown in Fig. 5, is essentially the same as upper blanket section 12. Gratings 40 and 41, similar to gratings 34 and 36, are joined to the interior of the jacket 10 just above and below the lower blanket section 16, respectively, to support the lower blanket section within the jacket. Helical ribs 32 between the pins 30 in lower blanket section 16 and upper blanket section 12 provide passages for coolant to flow respectively to and from the central fuel section 14. A hollow adaptor or connector 42, shown in Fig. 5, fits closely into the lower end of jacket 10 and is joined thereto. A self-orientation device 44, shown in Fig. 3 and explained more fully below, fits closely into the lower end of connector 42 and is joined thereto.

In a preferred embodiment of the present invention, each row 20 consists of a plurality of oblong tubes 46, best seen in Fig. 10, which may be made of stainless steel, the tubes in each panel being welded in side-to-side relationship along their narrow sides to form webs 47 therebetween. Each tube 46 has external cross-sectional dimensions of 0.224 inch by 0.088 inch and has a wall thickness of 0.007 inch, each tube being 32.50 inches long. Eleven tubes 46 are welded to form each coolant panel 20. There are nineteen such panels 20, or two hundred and nine tubes 46, therefore, in each fuel element. Between each pair of adjacent panels 20 is a thin rectangular fuel plate 18, consisting of uranium enriched in U-235 to 30.9 volume percent, the space between adjacent panels being 0.044 inch. Each fuel plate 18 is 30.50 inches long, 2.459 inches wide, and 0.040 inch thick. A 0.002 inch thick layer of bonding material 22, which may be sodium, is provided between each fuel plate 18 and panels 20 adjacent thereto. Referring now to Fig. 11, each fuel plate 18 has a notch 48 provided at the lower portion of one of its vertical edges. Projecting from the side of jacket 10 that is adjacent to notches 48 are a plurality of lugs 50 which register with the notches in fuel plates 18 to interdigitate therewith, thereby preventing the fuel plates from shifting within chambers 28. Were it not for notches 48 and lugs 50, fuel plates 18 might conceivably float to the top of chambers 28 into voids 29, the upper portions of the fuel plates thereby avoiding contact with bonding material 22 which is liquid at the temperatures at which the reactor is operated. Spacers 24 and 26, which may be stainless steel, are 2.464 inches wide, 0.044 inch thick, and 0.250 inch high. A V-edge 52, best shown in Figs. 9 and 11, is provided on spacers 24 and 26 to minimize coolant turbulence and fluid friction. Voids 29 are 1.500 inches high, 2.464 inches wide, and 0.044 inch thick. Jacket 10, which may be stainless steel, is 2.652 inches square on the outside and has a wall thickness of 0.094 inch; the length of the jacket, excluding the connector 42 and the self-orientation device 44, is 75.50 inches. Overall, the fuel element is 98.625 inches long.

Upper blanket section 12, as may be seen in Figure 7, consists of sixteen solid cylindrical pins 30 arranged in a square lattice on 0.577 inch centers and separated by helical ribs 32. Each pin 30 consists of a 0.392 inch diameter cylinder of U-238 bonded with sodium within a stainless steel tube having an outside diameter of 0.420 inch and a wall thickness of 0.010 inch. Pins 30 are 18.00 inches long, which is also the length of upper blanket section 12. Helical ribs 32, which may be stainless steel, have a 9.00-inch pitch and provide a separation of 0.157 inch between pins 30, and between the pins and jacket 10.

Referring now to Fig. 2, a handling head 54, having a trunk 56 and an enlarged conical knob 58, is joined to grating 36 which is confined at the top of upper blanket section 12 by tabs 38. Handling head 54, which may be stainless steel, provides means for grappling the fuel element to insert and withdraw it from a nuclear reactor and to assist in transporting the fuel element for processing after use in a reactor.

As mentioned previously, lower blanket section 16 is essentially the same as upper blanket section 12. Connector 42, which may be stainless steel, fits closely within the lower end of jacket 10, being disposed therebelow, and is joined thereto by welding; the upper end of the connector has a square cross section as does the jacket and the lower end of the connector has a circular cross section as does the self-orientation device 44. Self-orientation device 44, shown in Fig. 3, is disposed below connector 42 and has its upper end fitted closely within the connector, being joined thereto by welding. Self-orientation device 44 consists of a hollow cylinder 60, a positioner 62 slidably disposed within the cylinder and having a cruciform cross section, a shaft 64 joined at its lower end to the upper portion of the positioner and having a nut 65 at its upper end, a guide-stop 66 which consists of an outer ring 68 joined to the interior of the cylinder, an inner ring 70 slidably fitted about the shaft, and spokes 72 connecting the outer and inner rings, and a spring 74 slidably disposed about the shaft and acting between the guide-stop and the positioner to urge the latter downwardly from the former and to cause the nut to press against the guide-stop. The components of self-orientation device 44 may all be stainless steel, except the spring 74, which may be noncorrosive spring steel. Functionally, self-orientation device 44 serves to properly position the fuel element in the reactor and to act as a shock absorber in the event that the fuel element is dropped, rather than set, into place in a reactor. Cruciform-shaped slots must, of course, be provided in the base of the reactor core platform which is to receive fuel elements having self-orientation devices 44. Self-orientation device 44, it will be noted, provides a path therethrough for the flow of coolant through the fuel element.

In the fabrication and assembly of the fuel element of the present invention, fuel plates 18 are formed and are one of the final components to be placed in the fuel element. A portion of one of the sides of jacket 10 forms a door 76, shown in Figs. 8 and 11, which may be removed from the side of the jacket to provide an opening 78, shown in Figs. 4 and 9, through which the fuel element may be loaded with fuel plates 18. Lugs 50 are joined to and project from door 76. In loading a fuel element with fuel plates 18, the unloaded fuel element is positioned to have its axis lying in a horizontal plane with door 76 removed and opening 78 facing upwardly. Fuel plates 18 are inserted in chambers 28 in proximity with lower spacers 26 and with notches 48 aligned adjacent to opening 78. Molten sodium is then poured into chambers 28 about fuel plates 18 in an amount sufficient to completely envelop the fuel plates while providing voids 29 in the chambers when the fuel element is sealed and set in an upright position. Door 76 is then positioned over opening 78, with lugs 50 interdigitating notches 48 in fuel plates 18, and joined to jacket 10 by welding. Heating the fuel element to a temperature slightly above the melting point of sodium with the fuel element in an upright position will then cause the sodium within chambers 28 to gravitate and completely envelop fuel plates 18 while providing voids 29 thereabove within the chambers.

After the fuel element of the present invention has been used and it is desired to recover the unspent fuel portion of partially-spent fuel plates 18, door 76 is removed, the fuel element is heated to a temperature slightly above the melting point of sodium, and partially-spent fuel plates 18 are lifted from chambers 28 with the fuel element positioned in the same manner as when loading. Partially-spent fuel plates 18 may then be processed chemically and the unloaded fuel elements re-used. It is thus seen that only the fuel material itself need be processed, rather than the entire fuel element.

In the operation of the fuel element of the present invention, heat transfer medium and bonding material 22, which may be sodium or a sodium-potassium alloy, such materials being compatible with uranium and having high coefficients of thermal conductivity and relatively low melting points, is maintained as a liquid at the temperatures prevailing in the reactor core. Bonding material 22, as a liquid, is in intimate contact with the entire surface of fuel plates 18 and readily conducts heat therefrom to coolant panels 20. Coolant is made to flow upwardly through the fuel element in succession through self-orientation device 44, lower blanket section 16, coolant panels 20 in central fuel section 14, and upper fuel section 12. Such coolant may be sodium, as in the previously mentioned Zinn Patent 2,841,545, a sodium-potassium alloy or some other molten metal, light or heavy water, or any other coolant which is suitable from metallurgical, thermodynamic, and nuclear considerations of the reactor in which the fuel element is to be used. Coolant, in passing upwardly through tubes 46 arranged in rows 20, removes heat therefrom and maintains a low temperature gradient between the middle and surface portions of fuel plates 18, since the fuel plates are very thin and are cooled on both sides. Thermal stresses within fuel plates 18 are thereby essentially eliminated. As fuel plates 18 "grow" due to nuclear effects and expand due to temperature changes, fluid bonding material 22 yields and moves into the voids 29; likewise longitudinal movement of the fuel plates is free to take place. Any gaseous fission products released within chambers 28 will move into voids 29, thereby preventing any swelling and/or rupturing of the fuel element or pinching of tubes 46. Any forces which might be generated within the fuel element are prevented from distorting the fuel element by webs 47, formed by tubes 46. Mechanical stresses, as well as thermal stresses, are therefore seen to be essentially eliminated from the fuel element of the present invention.

Functionally, upper blanket section 12 and lower blanket section 16 serve to reflect neutrons back into central fuel section 14, thereby reducing the amount of fuel material required. Additionally, blanket sections 12 and 16, being made of fertile material such as U–238, breed fissionable material by neutron absorption, such fissionable material being separable from the fertile material for use as a fuel material.

It is to be appreciated that the fuel element of the present invention provides great latitude to the artisan in design and application. For example, the amount and distribution of fuel in the element may be readily varied by omitting fuel plates 18 from some chambers 28 and/or by increasing or decreasing the thickness or height of the fuel plates while utilizing other components of the fuel element in a standardized size and form. The geometry, number, and size of tubes 46 may also be varied to achieve various coolant flow rates for operation at different power levels or to vary the relative volume of the fuel element that is occupied by coolant panels 20. Tube rows 20 have been shown herein as a plurality of joined rectangular tubes; however, sheets having cleats, spokes or ribs protruding therefrom may be used to effect a structure similar to that shown in the drawings. In applications where the coolant to be used is one which is compatible with the fuel and bonding materials, e.g. sodium or sodium-potassium alloys, the chambers 28 may be vented at the top through the upper spacers 24 to provide an exit for gaseous fission products which are released from the fuel within the chambers. Although the cross section of the fuel element herein has been described and illustrated as a square, other cross sections may be designed utilizing the teachings given here, such as circular, triangular, and elliptical. It should also be realized that although stainless steel has been mentioned as a suitable material for many of the components of the present invention, other materials, such as zirconium, that fulfill the necessary chemical, mechanical, and nuclear requirements in a given application, may be used. Upper blanket section 12 and lower blanket section 16, it is to be appreciated, may be omitted completely if desired or they may be modified in geometry or substance to provide more or less neutron reflection and/or breeding of fissionable material, and to vary the impedance offered to the flow of coolant through the fuel element. Self-orientation device 44 and/or handling head 54 may also be omitted from the fuel element, if desired, or they may be modified to have forms other than those shown in the illustrated embodiment. No doubt, other variations, modifications, and substitutions will occur to those skilled in the nuclear art without departing from the scope of the present invention. It is intended, therefore, that the scope of the present invention be limited only by the scope of the appended claims.

What is claimed is:

1. An assembly comprising a rectangular jacket having one removable side, a plurality of coolant tubes positioned in the jacket, the coolant tubes being arranged in spaced parallel rows extending from the removable side to the opposite side of the jacket, the tubes in each row abutting sides and being joined to one another thereat, flat rectangular nuclear-fuel plates located in the spaces between the rows of coolant tubes, there being one plate to a space, each plate extending for substantially the entire distance between the removable side and the opposite side of the jacket, and fusible bonding material filling the spaces between each fuel plate and the adjacent rows of coolant tubes.

2. The assembly specified in claim 1, the coolant tubes being of oblong shape, the coolant tubes of each row abutting at their narrow sides, the assembly further comprising spacers placed between the rows of coolant tubes at the ends of the coolant tubes.

References Cited in the file of this patent

UNITED STATES PATENTS

| | | |
|---|---|---|
| 2,838,452 | West et al. | June 10, 1958 |
| 2,841,545 | Zinn | July 1, 1958 |
| 2,870,076 | Koch | Jan. 20, 1959 |
| 2,879,216 | Hurwitz et al. | Mar. 24, 1959 |